May 16, 1933.  F. LOWENTHAL  1,908,772
PICTURE
Filed Jan. 23, 1932
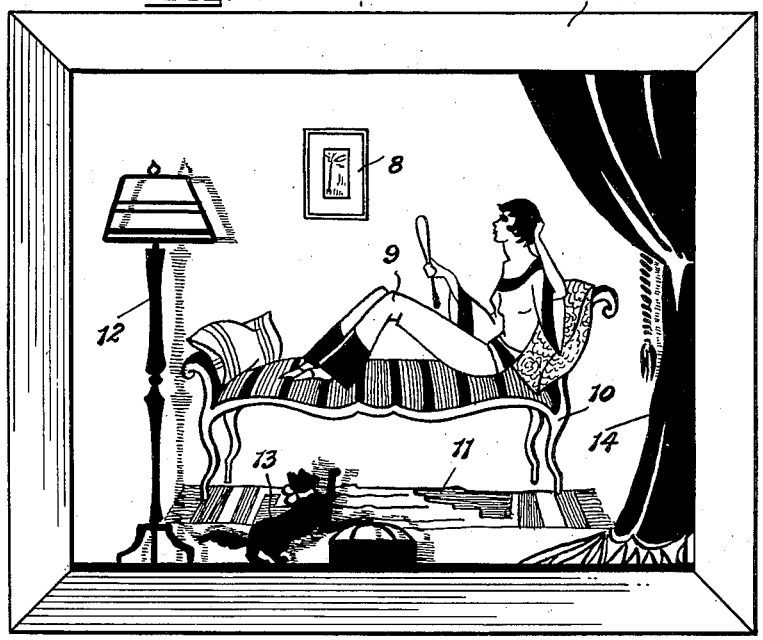
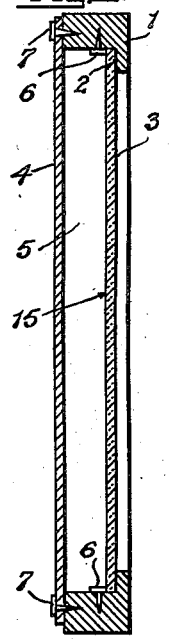
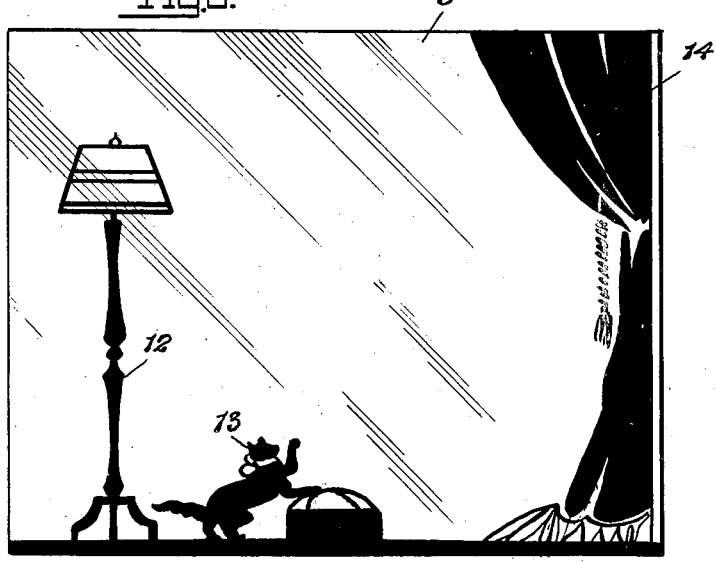
Inventor
Fred Lowenthal
By his Attorney
Harry Radzinsky Patented May 16, 1933

1,908,772

UNITED STATES PATENT OFFICE

FRED LOWENTHAL, OF NEW YORK, N. Y.

PICTURE

Application filed January 23, 1932. Serial No. 588,249.

This invention relates to pictures, particularly those of the framed kind.

The object of the invention is to provide a picture in which the illusion of depth and perspective is attained by a simple separation or spacing of the pictorial elements which co-operate to form the complete picture. I attain the desired result by utilizing the usual protective glass as a base or support for that part of the picture which is intended to form the foreground. The pictorial elements which form that portion of the picture are stamped, stencilled or otherwise reproduced on the glass in proper relationship to those pictorial elements which form the base or rear part of the picture, and the glass thus embellished is mounted in a picture frame at the front of the same. A suitable picture sheet is secured in the frame at or on the rear face of the same, the pictorial elements borne by said sheet being suitably positioned thereon with respect to those on the glass, but distanced therefrom. The resultant picture, being composed of two sets of elements, that is to say, those on the glass and those on the sheet, possesses the illusion of depth or solidity and many novel effects may be attained.

The manner in which the desired results are accomplished enables these pictures to be made rapidly and economically, resulting in an article which can be easily introduced at a minimum of expense and commercially sold.

In the drawing Fig. 1 is a front elevation of a picture made in accordance with this invention; Fig. 2 is a sectional view on the line 2—2 of Fig. 1, looking in the direction of the arrows, and Fig. 3 is a front elevation of the glass bearing certain picture elements.

In the illustrative embodiment of my invention shown in the accompanying drawing, 1 indicates a picture frame made of wood or of other conventional construction. It is provided with the usual shoulder portion 2. A glass or other like transparent member 3 fits within the frame and abuts against the shoulder portion. The glass is held in position within the frame by means of glazier's points, tacks or brads or by any other suitable means, such means being indicated at 6 in Fig. 2 of the drawing.

The glass 2 bears certain pictorial elements such as indicated at 12, 13 and 14, these elements being preferably produced upon the rear face 15 of the glass by stencilling, printing, painting or otherwise reproducing them directly upon the surface of the glass. The elements 12, 13, and 14 might also be paper cut-outs pasted upon the surface of the glass. These elements are preferably opaque in character and are adapted to co-operate with certain other pictorial elements 8, 9, 10 and 11 which are printed or otherwise produced upon the face of a card-board or other like sheet shown at 4.

The sheet 4 is separated or spaced from the glass by the thickness of the frame as indicated at 5, this desired spacing being attained by attaching the card-board sheet 4 on the back face of the frame 1 by any suitable fastening means, such as for instance the tacks 7.

The completed picture is shown in Fig. 1. The elements 12, 13 and 14 borne by the glass are so spaced and arranged relative to the elements 8, 9, 10 and 11 on the cardboard sheet that when the sheet and glass are held together by the frame in the spaced relationship described, the resultant picture appears to possess pictorial balance and depth and a very novel and interesting result is attained. The objects or picture elements 12, 13 and 14 form a desirable foreground for the elements 8, 9, 10 and 11 forming the rest of the picture, and pictures made up in the manner described are decorative and pleasing in appearance.

What I claim is:—

A picture having a frame, a glass or like transparency mounted in the frame adjacent the front of the same, the glass being provided on its rear face with pictorial elements, a sheet of opaque material attached at the back of the frame and spaced at a distance from the glass, said opaque sheet having pictorial elements on its front face, said elements being thus spaced from those on the back of the glass but co-operating therewith to form a complete picture.

Signed at the city, county and State of New York, on this 21st day of January, 1932.

FRED LOWENTHAL.